Patented June 15, 1937

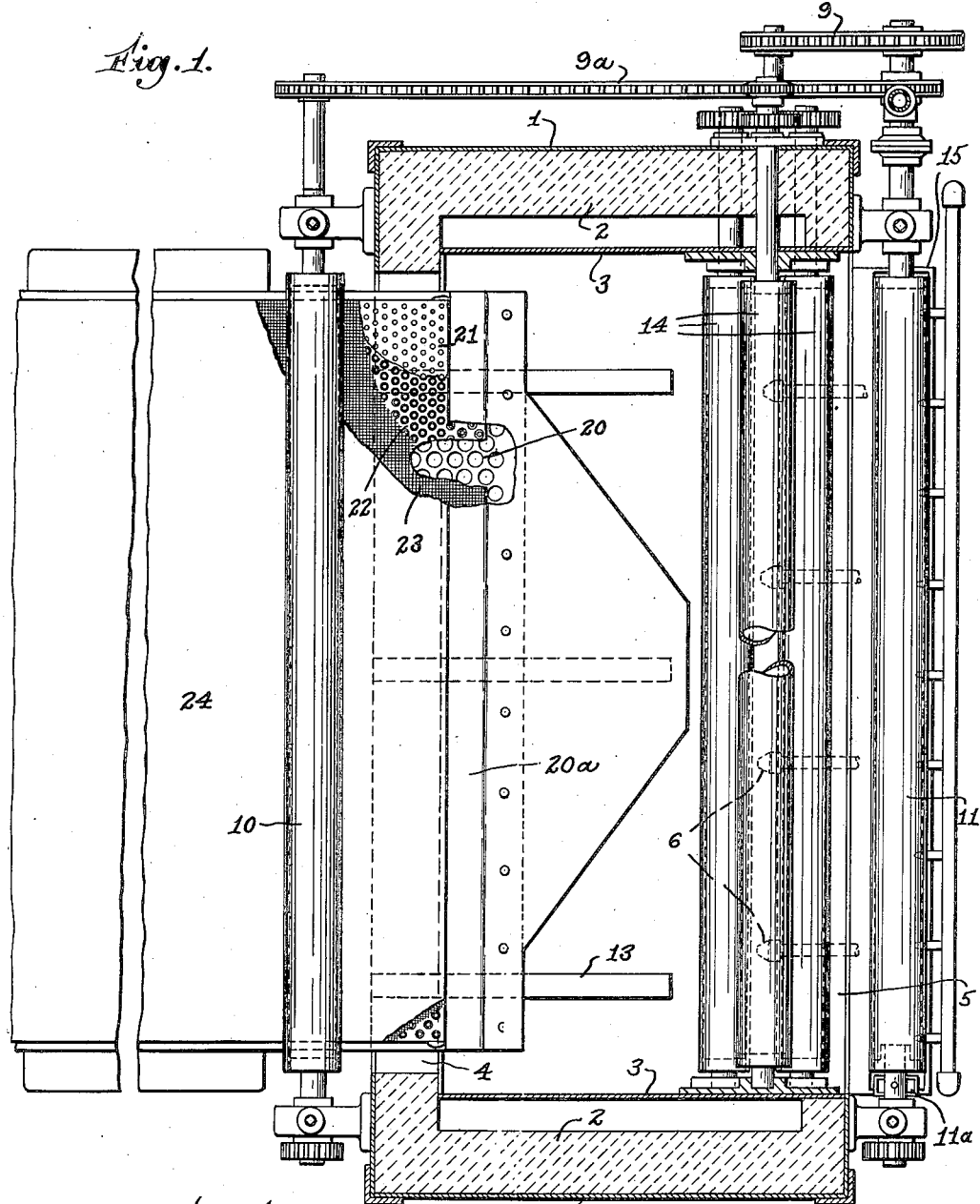

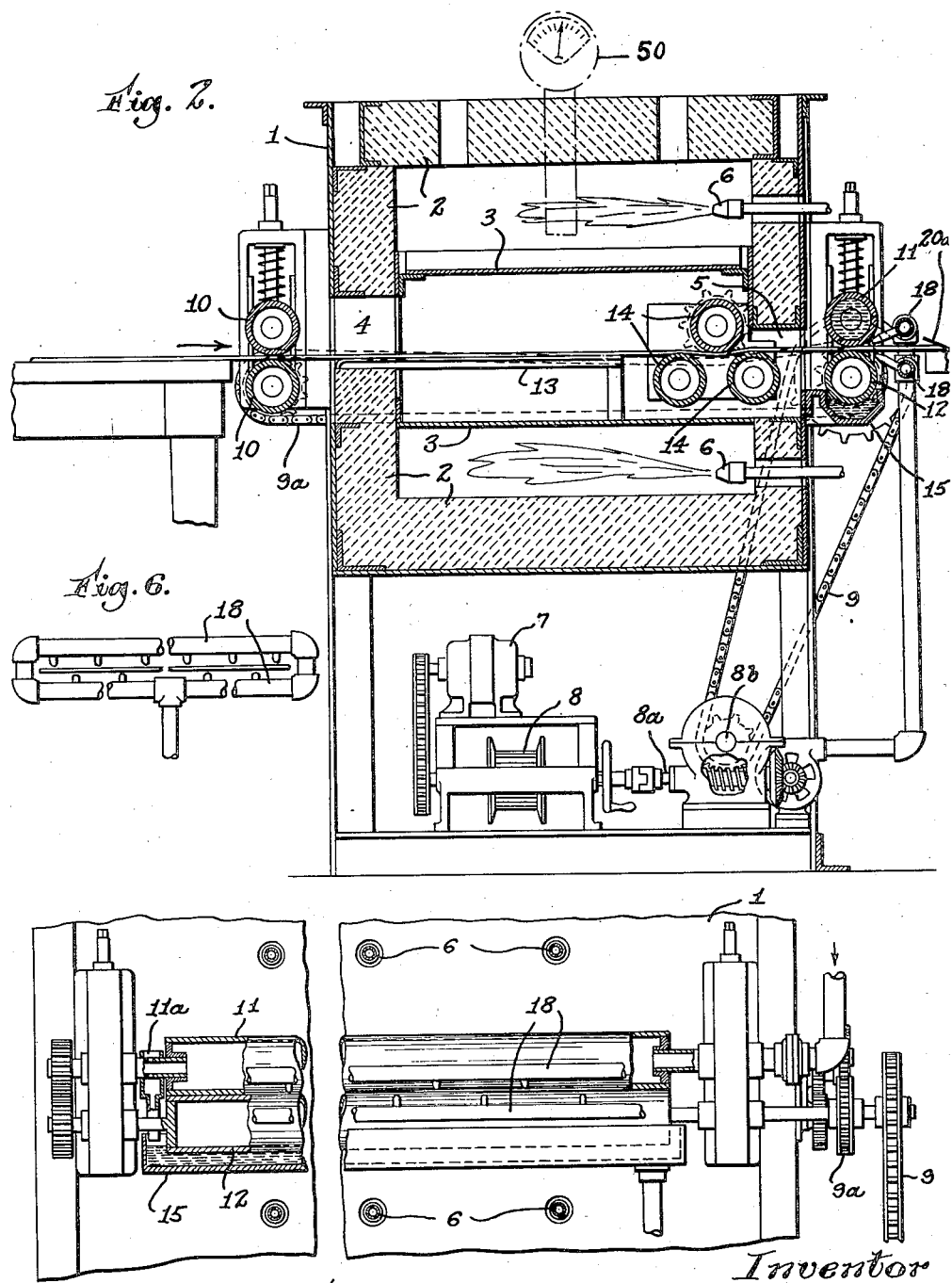

2,083,921

UNITED STATES PATENT OFFICE 2,083,921

FILTER MAKING APPARATUS

Eugene Roberts, Hastings, N. Y., assignor to The Western States Machine Company, Salt Lake City, Utah, a corporation of Utah Application January 29, 1934, Serial No. 708,843

9 Claims. (Cl. 113—111)

This invention relates to the production of a novel type of filter screen or sieve element, whose construction and method of manufacture forms the subject of a copending application filed by me. Essentially this new type of filter screen or sieve comprises a backing member of coarsely perforated, relatively stiff sheet metal, to one face of which is integrally united throughout the interforaminal areas a relatively limp fine foraminous filter sheet or sieve member by a film of low fusing metal, such as solder, thereby leaving the filtering areas of the sieve member subtending the coarse perforations of the sustaining backing sheet open for the passage of liquid. While the foraminous sieve sheet may be made either of fine wire gauze or of finely perforated thin sheet metal, according to the particular requirements in individual cases, the apparatus herein described and claimed is applicable to the production of both types of filtering element. For purposes of illustration the present drawings and specification will show and describe the practice of the invention as applied to the production of a filter element whose sieve member consists of fine wire cloth.

To aid in the effective and economical carrying out of the production of these screens on a commercial scale, I have devised a novel construction of apparatus hereinafter described and illustrated in the accompanying drawings, of which Fig. 1 is a plan view, partly in horizontal section, illustrating the construction of the apparatus and the means for feeding into the apparatus the layers comprising the filter screen or sheet.

Fig. 2 is a vertical section further illustrating the manner in which the several sheets of material are fed into and through the apparatus.

Fig. 3 is a detail view showing a rear end elevation of the apparatus to illustrate the means for cooling the assembled composite filter element.

Fig. 4 is a detail illustrating on an enlarged scale the assemblage of parts preparatory to feeding the members of the screen into the oven.

Fig. 5 is a detail showing in cross section, on a greatly enlarged scale, the finished product comprising the filter screen.

Fig. 6 shows in rear elevation the air cooling device.

In general, the invention comprises a heated oven maintained at a solder-fusing temperature and means for feeding through said oven at a predetermined rate of travel the laminations or sheets of material in proper assembled relation and means for uniting or pressing said sheets together while the intervening film or layer of solder is in fused condition. Preferably, the integrally united composite sheet is then subjected to active cooling means when it emerges from the oven.

In the form illustrated in the drawings, there is provided an outer casing 1, preferably lined with heat-resisting, heat-insulating material 2, inside of which is placed a fusing oven 3, there being provided an intake passage 4 through the casing and the oven and an opposed outlet passage 5 to permit the feeding through of the sheets of material to be treated, as hereinafter described.

The oven may be heated by any suitable means, such for example as gas burning jets 6 which, in Fig. 2 of the drawings, are shown projecting through the rear wall of the casing into the interior combustion chamber surrounding the oven 3. The temperature is regulated so as to maintain the temperature inside the oven at a solder-fusing point, so that as the composite sheets are fed through the oven the film of solder that is to integrally unite a perforated backing sheet 21 with a superimposed layer of fine wire mesh 23 is fused to form a matrix 22 receiving the fine wire mesh and integrally binding it to the interforaminal portions of the perforated backing sheet 21.

In front of the intake passage 4 are located two in-feeding rolls 10 spring pressed together to grip an interposed sheet and at the rear of the outlet passage 5 is arranged a pair of feeding, pressing and cooling rolls 11 and 12, both sets of rolls being spring pressed together to grip the interposed sheets firmly in order to afford proper feed of the material.

Inside the oven itself, and rearwardly of a sheet-supporting skeleton table or grid 13, is arranged a set of pressure rolls 14, in this case comprising two lower and one upper roll between which the sheet material travels toward the outlet. Any suitable means may be provided for actuating or driving the above-mentioned sets of rolls. In actual practice I have employed a driving motor 7 interconnected, by any suitable type of change speed transmission 8, with a worm shaft 8ᵃ arranged to drive a sprocket chain shaft 8ᵇ whose rotation is transmitted by the sprocket chain 9 and the forwardly extending sprocket chain 9ᵃ to driving sprockets connected with the driving roll of each set of rolls, each driving roll operating on its associated rolls through intermeshing pinions.

The rear rolls 11 and 12 serve not only as leveling or pressing rolls but also as cooling rolls and, for conveniently effecting that purpose, the upper roll forms a conduit for a stream of cold water which escapes through a short receiving funnel 11ª into an underneath water-receiving cooling trough 15, in which the bottom portion of the lower roll 12 is immersed.

To further hasten the cooling, I prefer to provide a cold air blast nozzle pipe 18 arranged to direct blasts or jets of air between the nip of the cooling rolls onto the surface of the sheet material as it emerges from the cooling rolls and, as shown in Fig. 6, the air blast pipe is preferably formed with upper and lower members or branches so that the cooling jets of air may be directed against both the top and the bottom of the sheet material being delivered from the cooling rolls.

Since the practice of the process involves the use of a film of fusible metal such as solder, which ordinarily will fuse at a temperature between 400° and 500° Fahrenheit, there must be a film of solder interposed between the perforated backing sheet 21 and the fine wire gauze sheet 23. Accordingly, a thin sheet of solder 22, provided with perforations arranged to register with the perforations in the backing sheet, but preferably with the perforations slightly larger than the perforations in the backing sheet, is placed upon the backing sheet and the sheet of wire gauze laid over it. In order to carry these three sheets into and through the fusing oven in correct and proper relation to each other, I have provided an underneath carrier sheet or draft sheet 20, above which are successively imposed the perforated backing sheet 21, the solder sheet 22 and the wire gauze 23. Moreover, I have found it advantageous to use a top or covering sheet 24, preferably made of aluminum, to which the fused solder does not adhere. The carrier or draft sheet 20 is preferably perforated to facilitate cooling of the product as it issues from the feeding rolls. Furthermore, to avoid displacement and secure the gripping of the intermediate sheets to the carrier sheet 20, the latter at its forward end is provided with a rearwardly turned lip 20ª under which is inserted the forward ends of the backing sheet, the solder sheet, the wire gauze and the top sheet. As the assembled material enters the nip of the rolls, the lip is pinched down forming a clamp firmly gripping the sheets together and preventing displacement as the sheet material is fed into each successive set of rolls. The aluminum top sheet aids not only in preventing displacement of the wire gauze on the underlying sheets, but also affords a level top surface for the fused material that passes through the oven. The feed and the temperature of the oven should be so regulated that the solder is in a fused condition at the time it passes through the presser and leveling rolls 14. These presser rolls serve to consolidate or press together the wire gauze and the backing sheet, the fused metal flowing between the interstices of the subtending areas of the wire gauze-forming matrix in which the wire mesh is firmly embedded and closely united to the backing sheet by the presser rolls. The cooling rolls 11 and 12 at the time of chilling or cooling the fused matrix serve to maintain or hold the wire mesh in close contact with the backing sheet, while the solder is being cooled, so that a practically perfect integral union between the wire gauze and the backing sheet is obtained.

After the composite filter sheet, so produced, has been removed, it may, if desired, be subjected to a smoothing or polishing operation by means of any suitable polishing or buffing rolls.

While I have shown and described a particular form of apparatus in connection with a gas heated furnace, it will be understood that the invention is not limited to any particular means of maintaining the proper temperature to fuse the film or sheet of solder which forms the protective matrix for the wire gauze and integrally unites it to the self-sustaining backing sheet. The air blast pipes are provided for the purpose of accelerating the cooling of the material.

The change speed transmission for driving the feed rolls permits regulation and control of the rate of feed of the sheets through the fusing oven by varying the time exposure of the material to the fusing action of the heat. The temperature of the oven is indicated by a thermometric device diagrammatically shown at 50 to facilitate proper regulation and control of the heat to adapt it to the different materials used.

While I have specifically referred to wire cloth as the sieve member of the filter element, it will of course be understood that the finely perforated, thin sheet metal is to be considered as the full equivalent or alternative of the wire cloth sieve member. In referring to a solder-fusing temperature in both the specification and the claims I contemplate temperatures appropriate for the fusion of whatever material may be used for bonding together the sheets forming the composite filter screen in accordance with the invention. Similarly, the term "solder" is used in its broader sense to include any such material without restriction to the particular alloy compositions commonly designated by the same name.

What I claim is:

1. An apparatus for producing a composite filter element of wire cloth and perforated backing sheet comprising an oven provided with intake and outlet openings, means for maintaining the interior of the oven at a solder-fusing temperature, and means for continuously feeding through said oven at a predetermined rate of travel sheets of coarsely perforated metal and of wire gauze assembled in face to face relation with an intervening layer of solder, and means located in said fusing oven for pressing said sheets together while the solder is in a fused condition.

2. An apparatus for producing a composite filter element of wire cloth and perforated backing sheet comprising an oven provided with intake and outlet openings, means for maintaining the interior of the oven at a solder-fusing temperature, and means for feeding through said oven at a predetermined rate of travel sheets of coarsely perforated metal and of wire gauze assembled in face to face relation with an intervening layer of solder, means within said oven for pressing said sheets together while the solder is in a fused condition, and means located beyond the outlet for simultaneously pressing together and cooling said sheets as they issue from the oven.

3. An apparatus for producing a composite filter element embracing a heated oven, sheet feeding rolls for feeding into said oven in unison assembled backing and filter sheets with an interposed layer of solder, pressure rolls located in the rearward portion of the chamber for pressing said sheets together when the solder has been fused, water cooled draft rolls located rearwardly of the oven for simultaneously subjecting the emerging sheets to cooling action and pressure and thereby fixing the wire gauze in a retaining matrix that is united with the backing sheet.

4. An apparatus for producing a composite filter element of the type described comprising a heated oven, in-feeding rolls arranged in advance of the oven to feed assembled sheets with an intervening layer of solder into the oven presser rolls, inside the oven, draft rolls arranged rearwardly of the oven, and means for cooling the sheets as they pass through the draft rolls.

5. An apparatus embracing in combination an oven heated to solder-fusing temperature, feeding means embracing feed rolls arranged, respectively, in front of and to the rear of said oven, and top and bottom draft sheets dimensioned to receive interposed backing and filter sheets and draw them in unison through the oven, and means for directing cooling blasts of air against said sheets close to the line where they pass through the rear feed rolls.

6. Means for feeding through a solder-fusing oven a pair of sheets in superposed relation with an intervening sheet of solder, comprising a forward pair of feed rolls, a rear pair of draft rolls, a pair of draft sheets comprising a perforated bottom sheet provided with a reversely turned gripping lip at its forward end and a top sheet, both dimensioned to receive intermediate sheets to be soldered together and draw said intermediate sheets through the oven in uniform relation to each other.

7. An apparatus for fusing together a pair of foraminous metallic sheets with an intervening film of solder embracing a solder-fusing oven, in-feeding rolls located in front of the oven, draft rolls located rearwardly of the oven, a pair of coacting draft sheets dimensioned to receive the interposed sheets that are to be soldered together and draw them through the oven, and means for cooling the sheets as they pass the draft rolls at the rear of the oven.

8. A solder-fusing oven, work gripping and feedings means comprising top and bottom draft sheets dimensioned to embrace the interposed work and coacting feed rolls arranged in front of and to the rear of the oven, the rear feed rolls being water cooled, and means for directing air blasts upon the sheets close to the line where they pass through the water cooled rolls.

9. An apparatus for uniting a fine foraminous sieve sheet to a relatively stiff coarsely perforated backing sheet embracing in combination a solder-fusing oven provided with intake and outlet openings to permit feeding the work through the oven, work feeding means, means for regulating the rate of feed through the oven, and means located inside said oven for pressing together the sheets to be united while the intervening film of solder is in a fused condition.

EUGENE ROBERTS.